(12) United States Patent
Weeks

(10) Patent No.: US 10,113,576 B1
(45) Date of Patent: Oct. 30, 2018

(54) CONNECTOR AND CONNECTOR SYSTEM FOR USE IN TOY WEAPONRY

(71) Applicant: Alex Brands Buzz Bee Toys (HK) Limited, Kowloon (HK)

(72) Inventor: Jarod Weeks, Bella Vista, AR (US)

(73) Assignee: Alex Brands Buzz Bee Toys (HK) Limited, Kowloon (HK)

( * ) Notice: Subject to any disclaimer, the term of this patent is extended or adjusted under 35 U.S.C. 154(b) by 0 days.

(21) Appl. No.: 15/665,491

(22) Filed: Aug. 1, 2017

(51) Int. Cl.
A63H 33/00 (2006.01)
A63H 33/26 (2006.01)
F16B 21/02 (2006.01)

(52) U.S. Cl.
CPC ........... *F16B 21/02* (2013.01); *A63H 33/009* (2013.01)

(58) Field of Classification Search
CPC ....... A63H 33/009; F16B 5/0092; F16B 5/10; F16L 37/24; Y10T 403/57; Y10T 403/5733; Y10T 403/7005; Y10T 403/7007
See application file for complete search history.

(56) References Cited

U.S. PATENT DOCUMENTS

| | | | | |
|---|---|---|---|---|
| 535,278 A * | 3/1895 | Downing | ................ | F16B 21/02 403/348 |
| 1,818,261 A * | 8/1931 | Koch | .................... | E21B 17/046 403/341 |
| 2,406,895 A * | 9/1946 | Olson | .................... | H01R 13/28 24/589.1 |
| 5,947,789 A * | 9/1999 | Chan | .................... | A63H 33/009 362/277 |
| 7,794,257 B2 * | 9/2010 | Rozet | .................... | H01R 13/28 439/290 |
| 8,998,674 B2 * | 4/2015 | Richins | ................ | A63H 33/003 446/473 |
| 2006/0280553 A1 * | 12/2006 | Anthony | ............... | F16B 7/0426 403/348 |
| 2015/0139723 A1 * | 5/2015 | Hsu | .......................... | F16B 3/00 403/348 |

OTHER PUBLICATIONS http://www.amazon.com/N-Force-Vendetta-Sword-Discontinued-manufacturer/dp/B004XMU6JQ.

* cited by examiner

Primary Examiner — John Ricci

(57) ABSTRACT

The present invention relates to a connector system for use in toy weaponry. The system comprises at least a first connector and a second connector of substantially identical configuration; the first and the second connectors being adapted to connect with a respective one of at least a first weapon and a second weapon. Each of the connectors comprises a first end adapted to connect with a handle portion of the respective weapon; and a second end having at least one engaging means; wherein the at least one engaging means of the first connector is configured to be releasably engageable with the at least one engaging means of the second connector, such that the first and the second weapons are connectable to form substantially a single weapon assembly operable at one common handle.

18 Claims, 15 Drawing Sheets

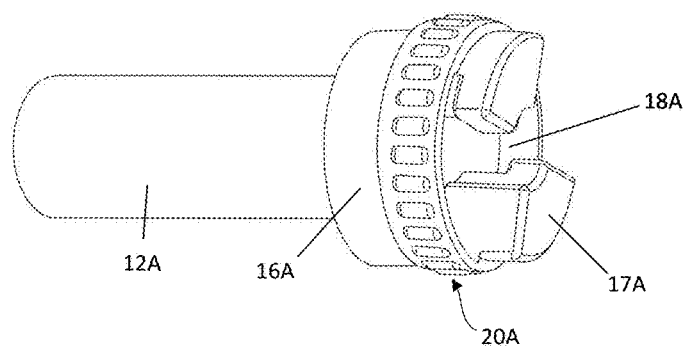
FIG. 3A
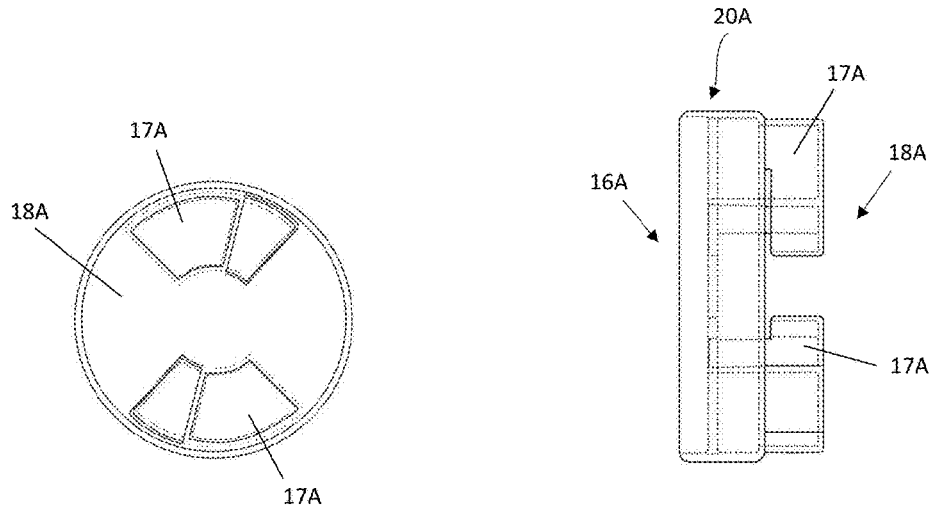
FIG. 3B                    FIG. 3C

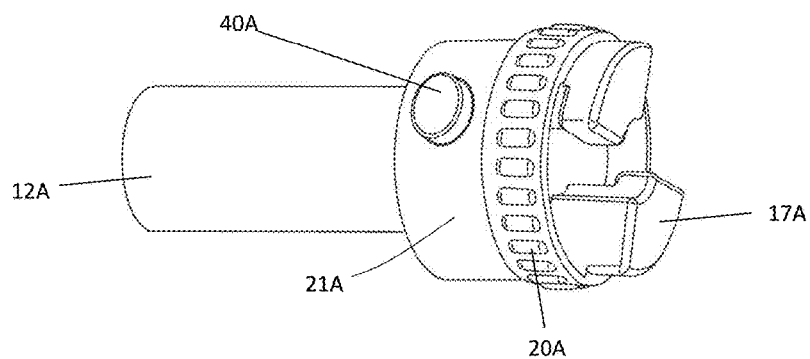
FIG. 9A
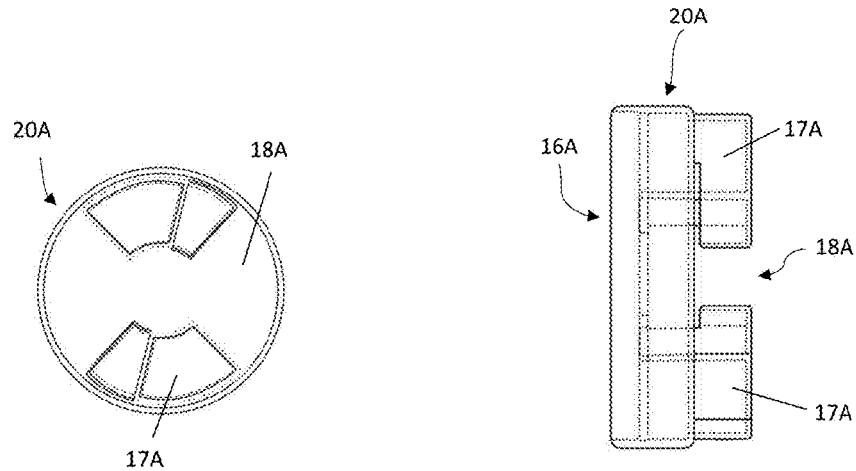
FIG. 9B
FIG. 9C

CONNECTOR AND CONNECTOR SYSTEM FOR USE IN TOY WEAPONRY

FIELD OF THE INVENTION

The invention relates to the field of toy weaponry and, particularly but not exclusively, to a connector system for use with toy weapons such as toy swords.

BACKGROUND OF THE INVENTION

A variety of toy weapons such as toy swords are available in the market. Particularly, toy swords have been manufactured in different designs and configurations to mimic the appearance and operation of real swords, as well as being formed of different materials to improve safety of the players during play. Toy swords have also been incorporated with various functional features, such as being provided with light and/or sound emitting components operable by the players to generate lighting and/or audio effects to further enhance the experience of the players.

OBJECTS OF THE INVENTION

An object of the present invention is to provide a novel connector system for use in toy weaponry.

Another object of the present invention is to provide a connector system for use in connecting a plurality of toy swords.

A further object of the present invention is to mitigate or obviate to some degree one or more problems associated with known toy connectors, or at least to provide a useful alternative.

The above objects are met by the combination of features of the main claim; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a connector system for use in toy weaponry. The system comprises at least a first connector and a second connector of substantially identical configuration. The first and the second connectors are adapted to connect with a respective one of at least a first weapon and a second weapon. Each of the connectors comprises a first end adapted to connect with a handle portion of the respective weapon; and a second end with at least one engaging means; wherein the at least one engaging means of the first connector is configured to be releasably engageable with the at least one engaging means of the second connector, such that the first and the second weapons are connectable to form substantially a single weapon assembly operable at one common handle.

In a second main aspect, the invention provides a connector for the connector system according to the first aspect. The connector comprises a first end connectable at a handle portion of a first weapon, and a second end comprises at least one engaging means; wherein the at least one engaging means is configured to be substantially identical to, and is releasably engageable with, a corresponding connecting portion of a second weapon, such that the first and the second weapons are connectable to form substantially a single weapon assembly operable at one common handle.

In a third main aspect, the invention provides a toy weaponry comprising one or more connector systems according to the first aspect for connecting a plurality of toy weapons to form substantially a single weapon assembly operable at one common handle.

In a fourth main aspect, the invention provides a kit of parts comprising one or more connector systems according to the first main aspect and a plurality of toy weapons, wherein the one or more connector systems are for connecting two or more of the plurality of toy weapons to form substantially a single weapon assembly operable at one common handle.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figure, of which:

FIG. 3A is a perspective view showing a connector according to a first embodiment of the present invention;

FIG. 3B is a front view of the connector of FIG. 3A;

FIG. 3C is a side view of the connector of FIG. 3A;

FIG. 9A is a perspective view showing a connector according to a third embodiment of the present invention;

FIG. 9B is a front view of the connector of FIG. 9A;

FIG. 9C is a side view of the connector of FIG. 9A;

DESCRIPTION OF PREFERRED EMBODIMENTS

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention relates to a connector system, and a connector of the connector system for use in toy weaponry. Particularly but not exclusively, the present invention relates to a connector system for interchangeably connecting a plurality of toy weapons such as, but not limited to, toy swords. The present invention also relates to toy weaponry comprising the connector system as described. Although the uses of the connector and the connector system in relation to the connection of toy swords are described in the present description as specific embodiments, a person skilled in the relevant art would appreciate that the present invention shall not be limited to the specific applications in respect of toy swords, but any other forms of toy weapons or toy tools such as, but not limited to, various types of daggers, axes, polearms, sticks, guns, shields, or the like, shall also be encompassed, as long as the variations are considered suitable and applicable, and without deviating from the original scope of the invention.

Figure 1A:
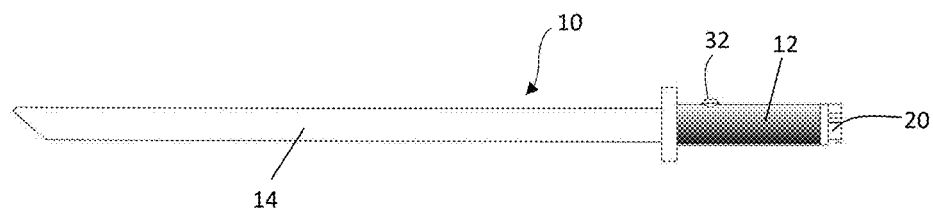
FIG. 1A shows a toy sword provided with a connector according to an embodiment of the present invention.
Figure 1B:
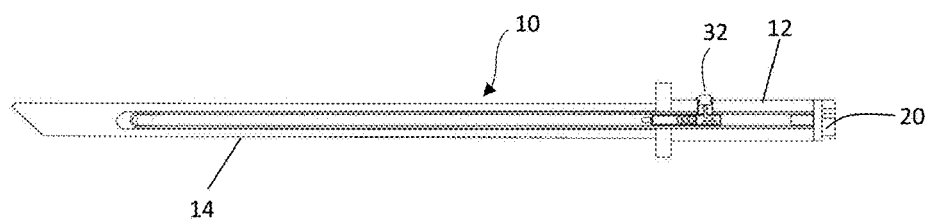
FIG. 1B shows a cross sectional view of the toy sword and the connector of FIG. 1A.
Figure 1C:
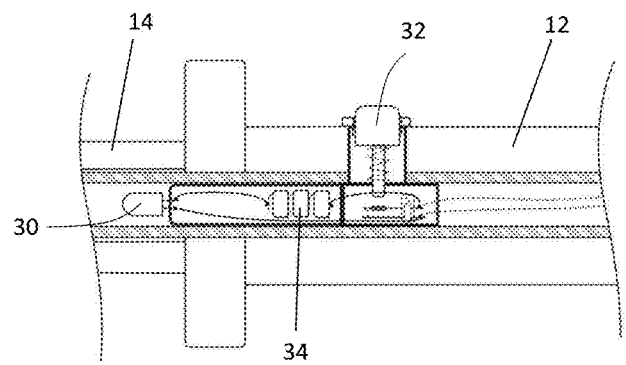
FIG. 1C shows a magnified view of a switch portion of the toy sword of FIG. 1B.

Referring to FIGS. 1A and 1B, shown is a toy weaponry in the form of a toy sword 10. Particularly, the toy sword 10 is provided at its handle portion 12, and more specifically, a distal end of the handle portion 12, with a connector 20 in accordance with an embodiment of the present invention. In one embodiment, the toy sword 10 can be provided in the form of a dummy sword with no additional, functional features. Alternatively, the toy sword 10 can have incorporated therein one or more signaling means 30, as shown in FIG. 1B, which may comprise, for example, one or more illuminating means such as LED lights, and/or sound-emitting means such as buzzers or audio players or speakers, etc. In the embodiment as shown in the figures, the toy sword 10 is provided with an LED light 30 at the base of a blade portion 14, with the LED light 30 being triggerable by a switch 32 located at the handle portion 12 of the sword 10. Specifically, the switch 32 is triggerable by a user of the toy sword 10 to electrically connect the LED light 30 with a power source 34, such as one or more batteries 34 provided at, for example, the handle portion 12 of the sword 10. A person skilled in the art would appreciate that the present invention shall not be limited to the specific configurations as described, but any possible variations such as modifications in terms of forms and types of the signaling means, locations of the signaling means and its triggering means such as the switch, means of actuation of the signaling means, as well as any related mechanisms in actuating the signaling means, etc. shall also be encompassed.

In one embodiment, at least part of the toy sword 10 is preferred to be formed of or at least partially covered by soft and/or resilient materials such as, but not limited to, one or more foam materials to enhance safety of the users during play. For example, the blade portion 14 of the toy sword 10 can be formed of or at least partially covered by foam material to thereby avoid potential injuries during a fighting game using the swords. Alternatively, different parts of the sword 10 may be formed of or at least partially covered by foam materials of different physical properties such as densities, hardnesses and/or resiliencies, etc., depending on the intended purposes of the parts. For example, the handle portion 12 can be formed of a more rigid foam material for a relatively more solid hand grip; or the blade portion 14 can be formed of a denser foam material to allow an improved sound absorption during an impact, for example.

Figure 2A:
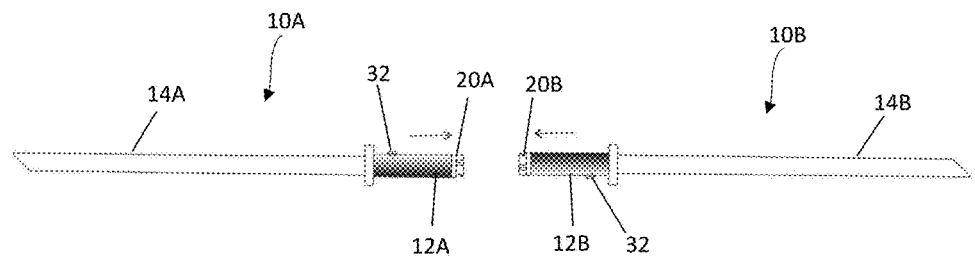
FIG. 2A shows two toy swords provided with a connector system according to an embodiment of the present invention prior to connection.
Figure 2B:
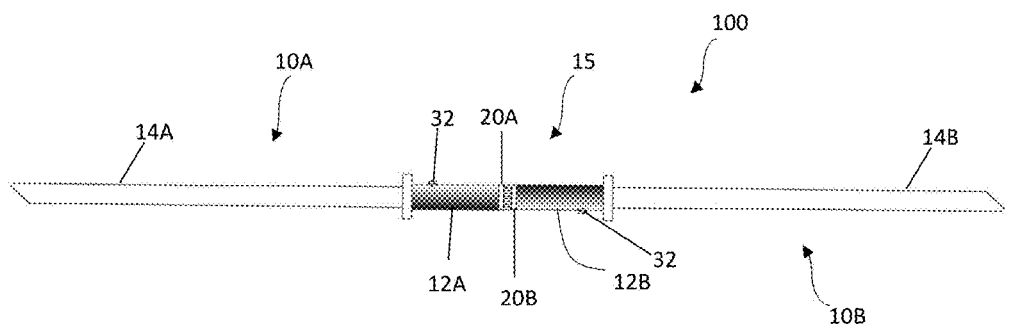
FIG. 2B shows the toy swords and the connector system of FIG. 2A after connection.
Figure 2C:
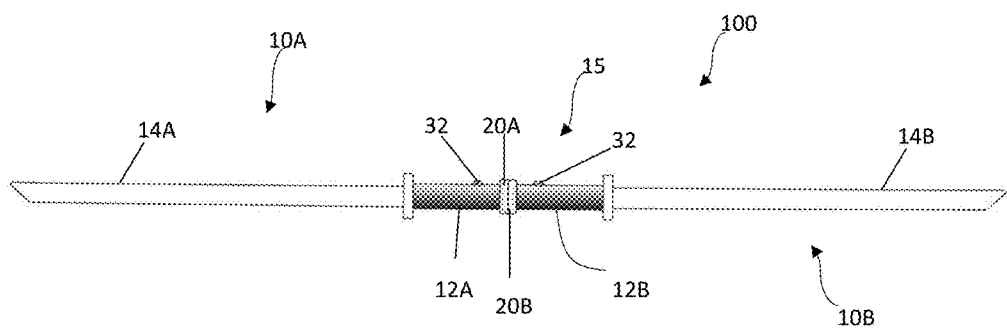
FIG. 2C shows two other toy swords and the connector system of FIG. 2A after connection.

The connection of two toy swords 10A and 10B via the connector system in accordance with an embodiment of the present invention is further illustrated in FIGS. 2A and 2B. Specifically, the swords 10A and 10B, each of which is provided at its rear, distal end of the handle portion 12 with a substantially cylindrical connector 20A and 20B, respectively, are adapted to be releasably connected in an end-to-end manner via the engagement of the connectors 20A and 20B, such that the two swords 10A and 10B are connected to form substantially a single weapon assembly 100 operable at one common handle 15 at the middle portion of the assembly 100 formed between the two blade portions 14A, 14B. Particularly, the two connectors 20A and 20B are of substantially identical in configuration, and are adapted to work cooperatively as a connector system. By being of substantially identical configuration, each of the two connectors 20A and 20B can be respectively connected to a third connector (not shown) also of substantially identical configuration. Thus, either of the two connectors 20A and 20B can be engaged with the third connector to form a combined weapon comprising the weapon of the third connector and the respective weapon of whichever of the two connectors 20A and 20B is engaged with the third connector. By forming the connector for each weapon to be of substantially identical configurations, this enables any two or more of a plurality of weapons to be releasably engaged to form a new combined weapon. FIG. 2C further shows the connectors 20A and 20B in connecting two toy swords with slight modification at the positioning of the switches 32 at the handle portions 12. Features of the connectors 20A and 20B are shown more clearly in FIGS. 3A to 3C and 4A to 4B, respectively, with their cooperative engagement being further illustrated in FIGS. 5A to 5C.

As shown in the figures, and particularly, FIGS. 3A to 3C and 4A to 4B, the connectors 20A and 20B may each comprise a first end 16, for example, a first end 16A of the first connector 20A, which is adapted to connect with the handle portion 12A of the respective toy sword 10A; and a second end 18, for example, a second end 18A of the first connector 20A, which is adapted to engage a corresponding second end of its connector counterpart, for example, a second end 18B of the second connector 20B. Specifically, each of the second ends 18 may comprise at least one engaging means 17, for example, the second end 18A of the connector 20A may comprise at least one engaging means 17A; and the second end 18B of the connector 20B may comprise at least one engaging means 17B; with the respective engaging means 17A and 17B being configured to be releasably engageable with one another such that the swords 10A and 10B are connectable to form substantially a single weapon assembly 100 operable at one common handle 15. The at least one engaging means 17A and the at least one engaging means 17B are preferably of substantially identical configurations. Preferably also, the at least one engaging means 17A and the at least one engaging means 17B are preferably of substantially identical configurations with the at least one engaging means of a third connector. Thus, it is possible with the connector arrangement described herein to provide a kit of parts of a plurality of substantially identical connectors and a plurality of weapons whereby any two or more of the plurality of weapons can be interchangeably and releasably connected to form a combined weapon operable at a common handle part.

Figure 4A:
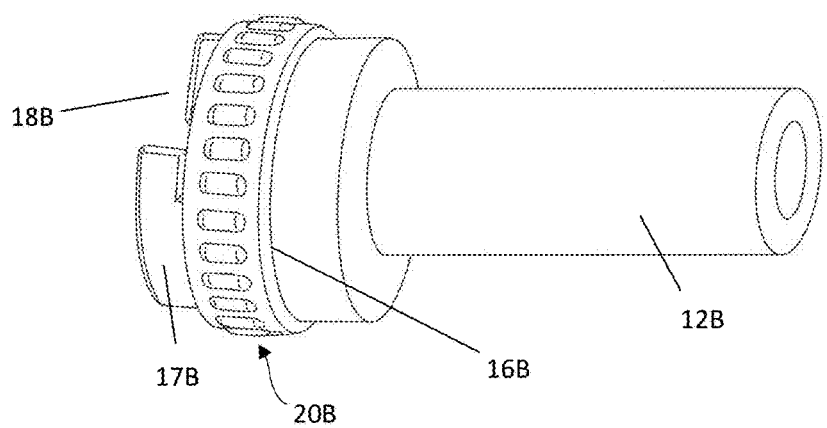
FIG. 4A is a perspective view showing a corresponding connector connectable with the connector of FIG. 3A.
Figure 4B:
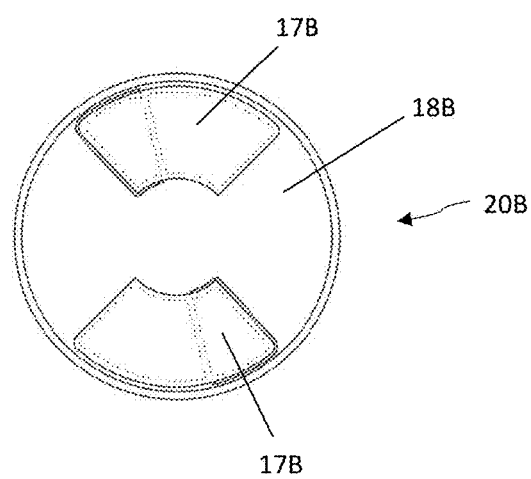
FIG. 4B is a front view of the connector of FIG. 4A.
Figure 5A:
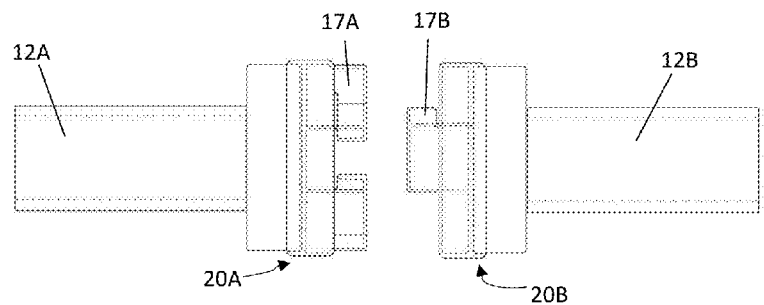
FIG. 5A shows a cross sectional view of the connectors of FIGS. 2A and 3A prior to connection.
Figure 5B:
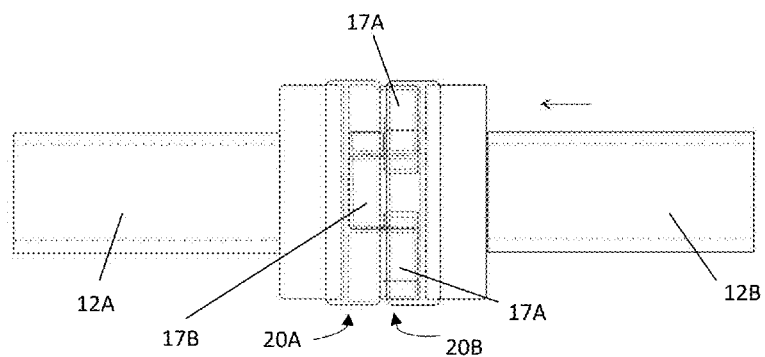
FIG. 5B shows the connectors of FIGS. 2A and 3A before a twist-locking.
Figure 5C:
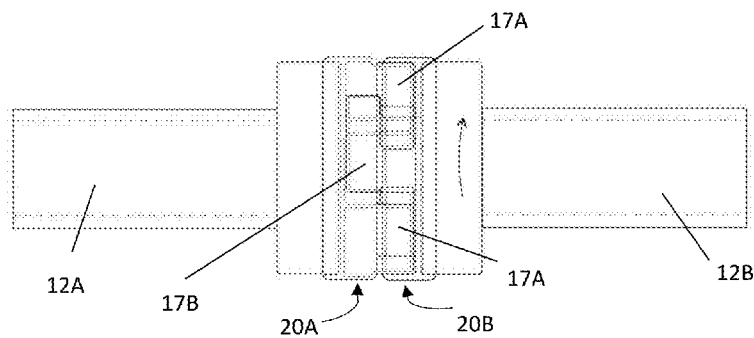
FIG. 5C shows the connectors of FIGS. 2A and 3A after the twist-locking.
Figure 6A:
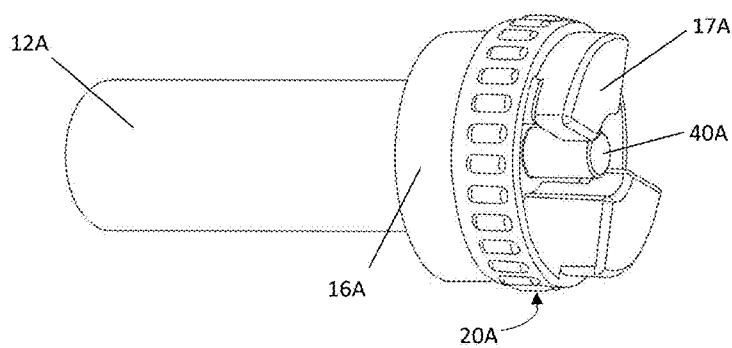
FIG. 6A is a perspective view showing a connector according to a second embodiment of the present invention.
Figure 6B:
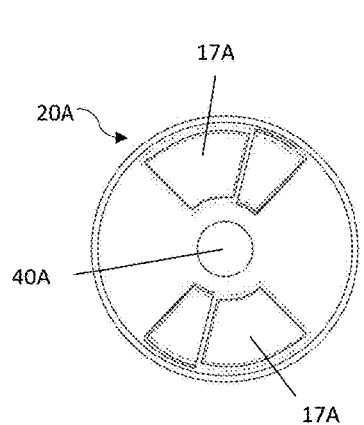
FIG. 6B is a front view of the connector of FIG. 6A.
Figure 6C:
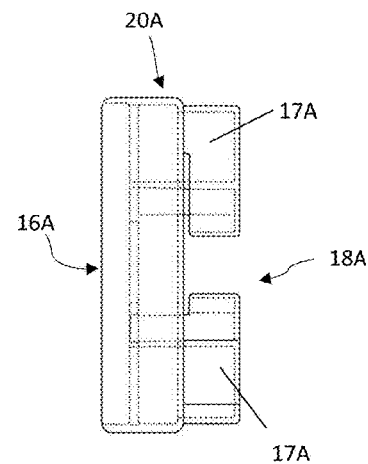
FIG. 6C is a side view of the connector of FIG. 6A.
Figure 7A:
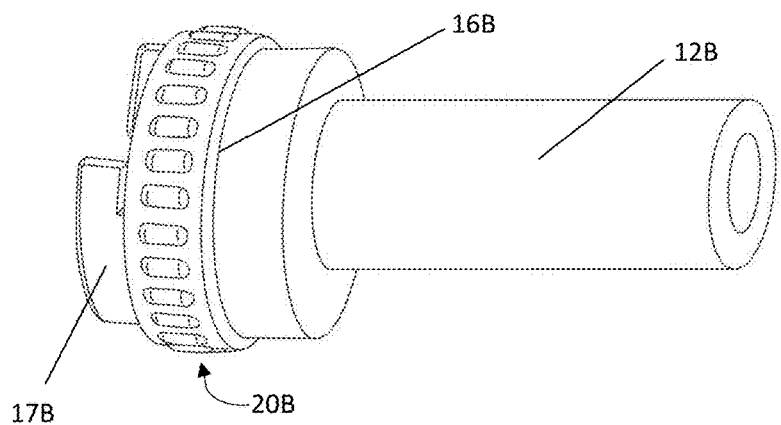
FIG. 7A is a perspective view showing a corresponding connector connectable with the connector of FIG. 6A.
Figure 7B:
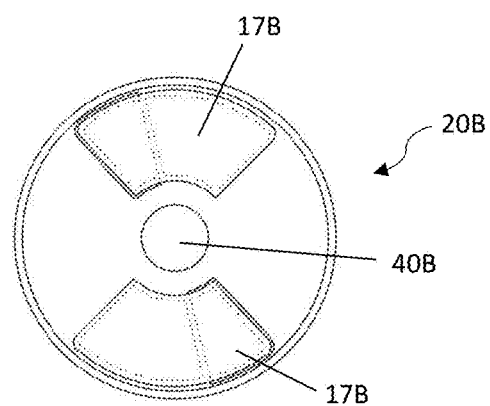
FIG. 7B is a front view of the connector of FIG. 7A.

In one preferred embodiment, the engaging means 17A of the connector 20A is configured to substantially conform with the engaging means 17B of the connector 20B to thereby allow engagement between the connectors 20A and 20B in close conformity. More preferably, the engaging means 17A may comprise one or more protrusions or recesses which conform with corresponding one or more protrusions or recesses of the engaging means 17B. For example, the engaging means 17A of the connector 20A may comprise two fan-shaped protrusions interspersed by two correspondingly-shaped grooves or recesses, as shown in FIGS. 3A and 3B, with the protrusions and recesses being configured to engage and receive a matching set of protrusions and recesses of the engaging means 17B, as shown in FIGS. 4A and 4B. The engaging means 17A and 17B, after engaged, can be kept in place by the frictional contacts among one or more walls the respective protrusions and recesses. Additionally or alternatively, the engaging means 17A and 17B may also be mechanically interlocked by, for example, twist-locking and/or snap-fitting mechanisms. For example, the engaging means 17A and 17B can be configured as per FIGS. 3A and 4A, such that the two connector counterparts can be interlocked via a twist-locking action, as shown in FIGS. 5A to 5C. Specifically, FIG. 5A shows the connectors 20A and 20B with the corresponding engaging means 17A and 17B being aligned before engagement; FIG. 5B shows the aligned connectors 20A and 20B being brought into contact with the engaging means 17A and 17B engaged; and FIG. 5C shows rotation of the connector 20B (or alternatively, the connector 20A) to interlock the engaging means 17A and 17B so as to allow a secure connection between the connectors 20A and 20B and thus, the weapons 10A and 10B.

Preferably, the connectors 20A and 20B are configured such that, when engaged, the engaging means 17A and 17B are substantially concealed from view from an exterior of the connected weapon assembly 100. More preferably, the engaging means 17A and 17B may be constructed to be formed of one or more electrically conducting materials, such that when engaged, the engaging means 17A and 17B are adapted to allow electric connection between the connectors 20A and 20B, and thus the weapons 10A and 10B.

In one embodiment, the first end 16A or 16B of the connector 20A or 20B can be fixedly attached to the handle portion 12A or 12B of the respective weapon 10A or 10B, although it is more preferable for the first end 16A or 16B to be configured as being releasably connectable with the handle portion 12A or 12B of the respective weapon 10A or 10B. Preferably, the first end 16A or 16B is adapted to releasably connect with respective handle portion of any one or more toy weapons, provided the handle portion or more specifically, the distal end of the handle portion, is arranged to be substantially similar in configuration to that of the handle portion 12A or 12B, such that the connector 20 of the present invention can be used interchangeably to connect one or more of the weapons 10A, 10 B, or any other weapons having similarly configured handle portions. The same connectors 20A and 20B may thus be used to connect toy weapons of different functions and/or designs in various combinations. For example, a connector system comprising connectors 20A and 20B can be used to interchangeably connect a toy sword with a toy spear in an end-to-end manner; and the same system can further be used to connect a toy axe with a toy dagger in an end-to-end manner, etc., as long as the corresponding distal ends of the handle portions of these toy weapons are configured to be substantially similar for the purpose of connecting with the respective first end of the connectors.

Figure 8A:
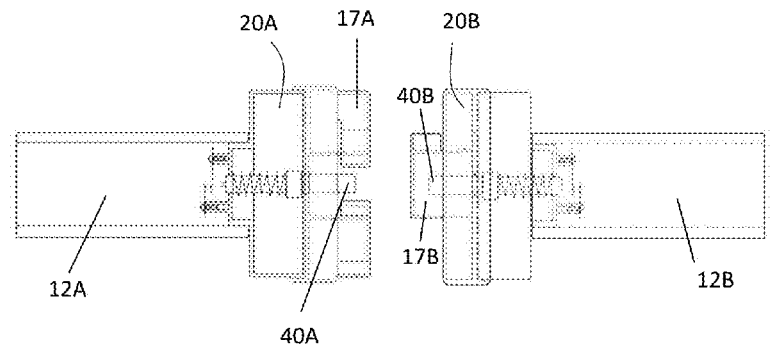
FIG. 8A shows a cross sectional view of the connectors of FIGS. 6A and 7A prior to connection.
Figure 8B:
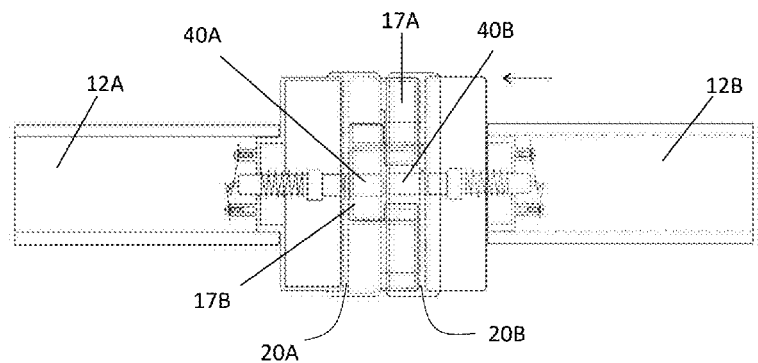
FIG. 8B shows the connectors of FIGS. 6A and 7A before a twist-locking.
Figure 8C:
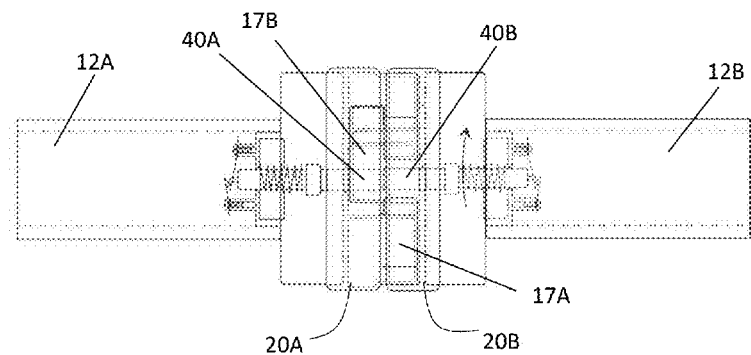
FIG. 8C shows the connectors of FIGS. 6A and 7A after the twist-locking.

FIGS. 6A to 6C, and 7A to 7B show a second embodiment of the connector system in accordance with the present invention. In this embodiment, the connectors 20A and 20B as well as the corresponding engaging means 17A and 18B are configured to be substantially similar to those of the first embodiment as described above. The connectors 20A and 20B are both cylindrical and are substantially identical in configuration. Particularly, one or more of the connectors 20A and 20B may further comprise a switch or press button 40 triggerable to electrically connect one or more signaling means (not shown) provided at the weapon 10A and/or 10B with a power source such as one or more batteries (not shown). For example, one or more switches 40 can be resiliently arranged at the second end 18A and/or 18B of the connector 20A and/or 20B, such as but not restricted to, the center region of the second end 18A/18B adjacent the engaging means 17A/17B, such that when the two toy weapons 10A and 10B are connected via the respective connectors 20A and 20B, one or more of the switches 40A and 40B are adapted to be automatically triggered to actuate the signaling means of the toy swords. FIGS. 8A to 8C further illustrate a twist-locking engagement of the connectors 20A and 20B and the actuation of the switches 40A and 40B upon connection of the two toy weapons 10A, 10B. Disengagement of the connectors 20A and 20B may automatically release the switches 40A and 40B from their actuated state, and thus, electrically disconnect the corresponding signaling means from the power source to disable the signaling means.

Figure 10A:
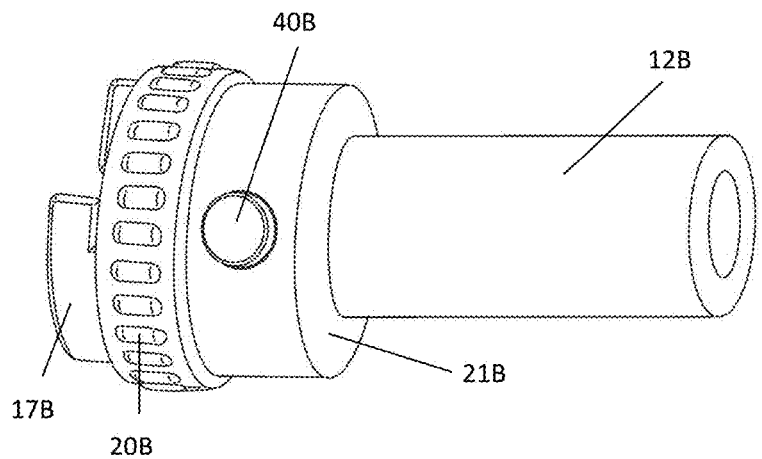
FIG. 10A is a perspective view showing a corresponding connector connectable with the connector of FIG. 9A.
Figure 10B:
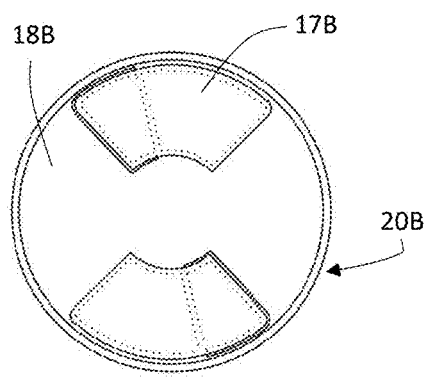
FIG. 10B is a front view of the connector of FIG. 10A.
Figure 11A:
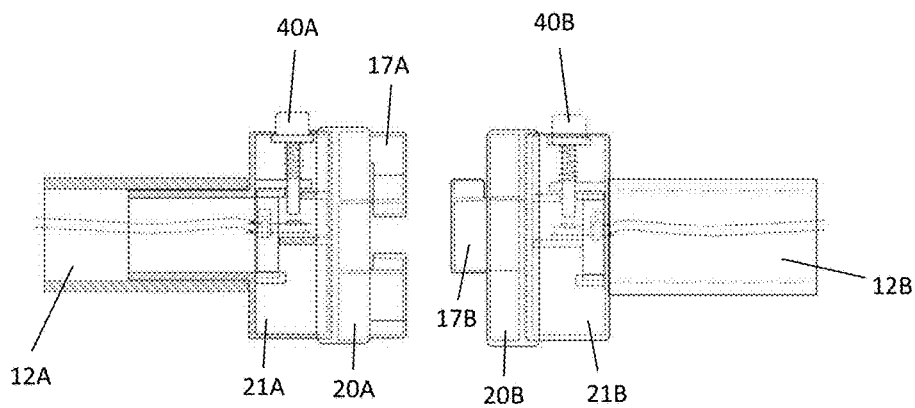
FIG. 11A shows a cross sectional view of the connectors of FIGS. 9A and 10A prior to connection.
Figure 11B:
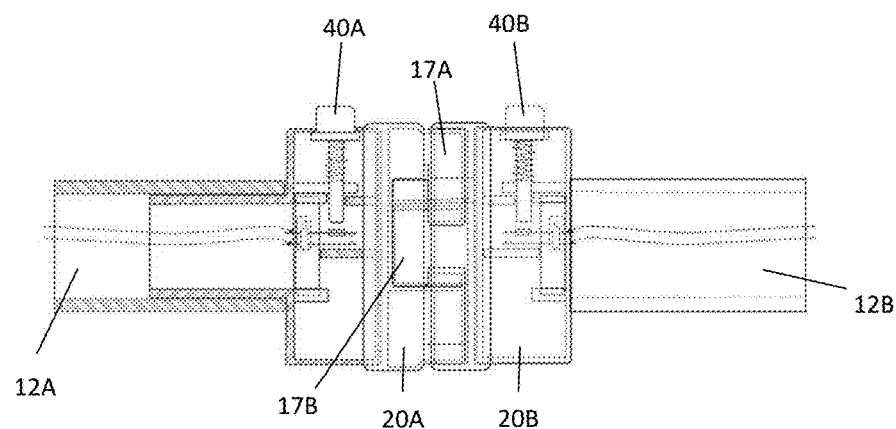
FIG. 11B shows the connectors of FIGS. 9A and 10A after connection.
Figure 11C:
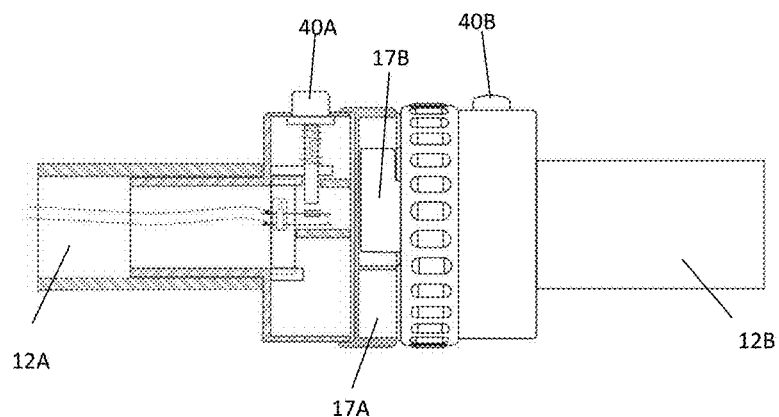
FIG. 11C shows a partial cross sectional view of the connectors of FIGS. 9A and 10A before triggering of a switch.
Figure 11D:
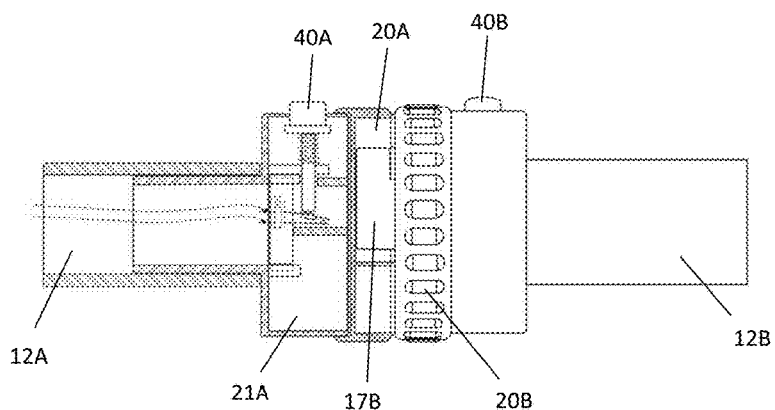
FIG. 11D shows a partial cross sectional view of the connectors of FIGS. 9A and 10A after triggering of the switch.

FIGS. 9A to 9C, and 10A to 10B show a third embodiment of the connector system in accordance with the present invention. In this embodiment, each of the connectors 20A and 20B, which are substantially identically configured, may comprise a switch or press button 40 provided at the peripheral side wall of the respective connector. In one embodiment, the switch 40A/40B may alternatively be provided at an extended portion 21A/21B of the respective connector 20A/20B, with the extended portion 21A/21B as comprising the respective first end 16A/16B and being adapted to connect with the handle portion 12A/12B, as shown in FIGS. 9A and 10A. One or more of the switches 40A and/or 40B are adapted to be manually triggerable by the player to selectively actuate one or more signaling means (not shown) provided at the respective toy weapons 10A and 10B. FIGS. 11A to 11C further illustrate the twist-locking mechanism between the connectors 20A and 20B, and FIG. 11D shows the triggering of the switch 40A at the connector 20A to actuate the signaling means 30A (not shown) of the toy weapon 10A.

Figure 12:
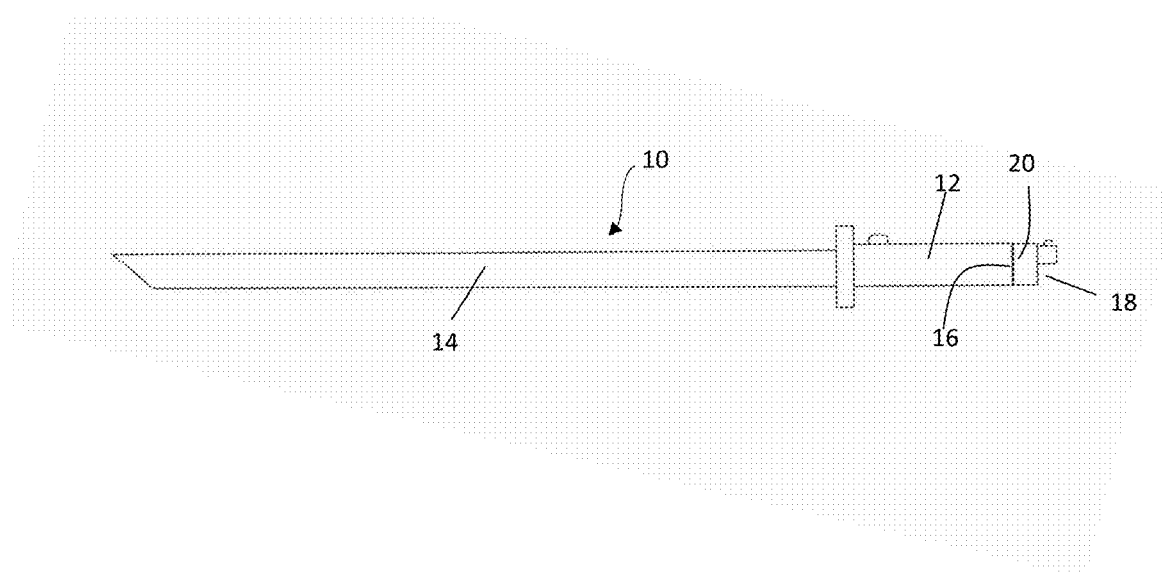
FIG. 12 shows another toy sword provided with a connector according to a fourth embodiment of the present invention.
Figure 13A:
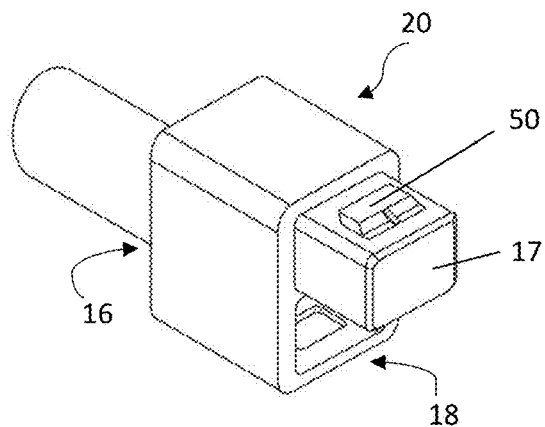
FIG. 13A shows a perspective view of the connector of FIG. 12.
Figure 13B:
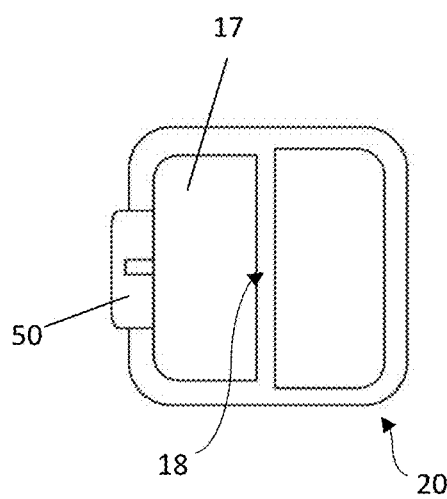
FIG. 13B shows a front view of the connector of FIG. 13A.
Figure 14A:
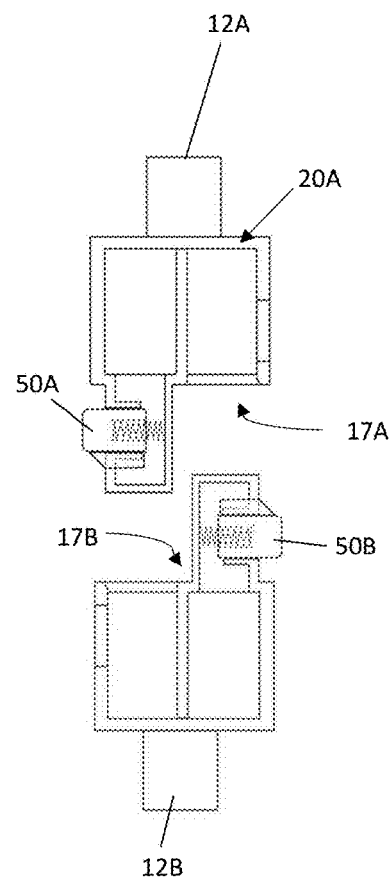
FIG. 14A shows a cross sectional view of two connectors of FIG. 12 prior to connection.
Figure 14B:
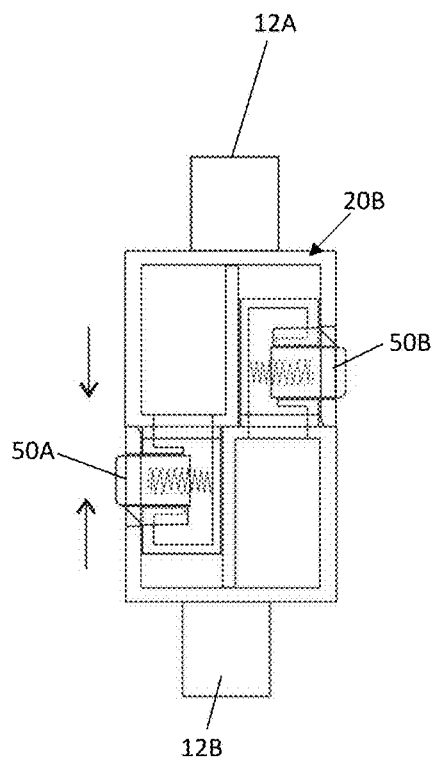
FIG. 14B shows the two connectors of FIG. 14A after a snap-locking.

Referring to FIG. 12, shown is a toy sword 10 connected at its distal end of the handle portion 12 a connector 20 in accordance with a further embodiment of the present invention. In this embodiment, the connector 20 is configured substantially in the shape of a rectangular prism having a first end 16 connectable with the handle portion 12 of the toy sword, and a second end 18 adapted to connect with a corresponding second end of a corresponding, connecting portion of a connector counterpart. Features of the connector 20 are more clearly illustrated in FIGS. 13A and 13B. Particularly, the connector 20 at its second end 18 is provided with one or more engaging means 17, for example, a block protrusion and a correspondingly-shaped recess, as illustrated in FIG. 13A. The connector 20 further comprises a releasing means 50 actuatable to disengage the engaging means 17A of one connector, for example, a connector 20A from the engaging means 17B of its corresponding counterpart of connector 20B, as shown in FIGS. 14A and 14B. The two connectors 20A and 20B and more specifically, the corresponding engaging means 17A and 17B are configured to be substantially identical to each other, such that the connectors 20A and 20B can be used interchangeably in connecting with the two toy weapons 10A and 10B, and that the two weapons 10A and 10B are releasably connectable to form substantially a single weapon assembly operable at one single, common handle.

FIGS. 14A and 14B further show the connectors 20A and 20B before and after engagement of the corresponding engaging means 17A and 17B. Particularly, the block protrusion and the recess 17A of the connector 20A are shaped to conform with the corresponding recess and block protrusion 17B of the connector 20B, such that when the corresponding engaging means 17A and 17B are aligned and are brought to connect, the protrusions can be snugly received by the corresponding recesses and subsequently, be locked in place via a snap-fit connection. To release the connection, both of the releasing means 50A and 50B would have to be simultaneously pressed by the player, followed by separating the two connectors 20A and 20B from each other to disengage the two toy weapons 10A and 10B.

The present invention also relates to a connector system for use in toy weaponry which comprises at least two substantially identical connectors as described above. The present invention further relates to a toy weaponry comprising one or more of the above described connector systems which are adapted to connect, and preferably, interchangeably connect a plurality of toy weapons to thereby form substantially a single weapon assembly operable at one common handle.

The present invention is advantageous in that it provides a connector system comprises at least two substantially identical connectors adapted to be used interchangeably in connecting two or more toys weapons to thereby forming a substantially single weapon assembly operable at one common handle. Specifically, each of the connectors of the connector system comprises at least one engaging means configured to substantially conform with a respective at least one engaging means of its connector counterpart to thereby releasably connect the plurality of toy weapons in forming the single weapon assembly. A plurality of toy weapons of different functions and/or designs may thus be interchangeably and releasably connected by using one same set of connector system to provide a weapon assembly with weapons of different combinations. This allows variations during a play and thus, significantly enhance the experience of the users.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims hereof, any element expressed as a means for performing a specified function is intended to encompass any way of performing that function. The invention as defined by such claims resides in the fact that the functionalities provided by the various recited means are combined and brought together in the manner which the claims call for. It is thus regarded that any means that can provide those functionalities are equivalent to those shown herein.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art is referred to herein, such prior art does not constitute an admission that the prior art forms a part of the common general knowledge in the art.

The invention claimed is:

1. A connector system for use in toy weaponry, the system comprising:
   at least a first connector and a second connector of substantially identical configuration, the first and the second connectors being adapted to connect with a respective one of at least a first weapon and a second weapon; each of the connectors comprising:
   a first end adapted to connect with a handle portion of the respective weapon; and
   a second end having at least one engaging means;
   wherein the at least one engaging means of the first connector is configured to be releasably engageable with the at least one engaging means of the second connector, such that the first and the second weapons are connectable to form substantially a single weapon assembly operable at one common handle;
   wherein at least one of the first and the second connectors comprises a switch triggerable to electrically connect one or more signalling means provided at one or more of the first and the second weapons with a power source; and
   wherein the one or more signalling means are provided at one or more blade portions of the one or more weapons.

2. The connector system according to claim 1, wherein the at least one engaging means of the first connector is configured to substantially conform with the at least one engaging means of the second connector to there by allow connection between the first and the second weapons.

3. The connector system according to claim 1, wherein the at least one engaging means of the first connector comprises one or more protrusions or recesses which conform with corresponding one or more protrusions or recesses of the at least one engaging means of the second connector.

4. The connector system according to claim 1, wherein the at least one engaging means of the first connector is adapted to engage the at least one engaging means of the second connector via one or more of a snap-fitting mechanism and a twist-locking mechanism.

5. The connector system according to claim 1, wherein at least one of the first connector and the second connector is interchangeably connectable with the respective first and second weapons.

6. The connector system according to claim 1, wherein the at least one engaging means of the first connector and the at least one engaging means of the second connector, when engaged, are substantially concealed from view from an exterior of the weapon assembly.

7. The connector system according to claim 1, wherein at least one of the first and the second connectors comprises a switch triggerable to electrically connect one or more signalling means provided at one or more of the first and the second weapons with a power source.

8. The connector system according to claim 7, wherein the one or more signalling means comprise one or more of an illuminating means and a sound-emitting means.

9. The connector system according to claim 7, wherein the switch is automatically triggerable when the first weapon is connected with the second weapon.

10. The connector system according to claim 1, wherein the at least one engaging means of the first connector is adapted to electrically connect the at least one engaging means of the second connector, thereby allowing electric connection between the first and the second weapons.

11. The connector system according to claim 1, wherein at least one of the first and the second connectors comprises a releasing means actuatable to disengage the at least one engaging means of the first connector from the at least one engaging means of the second connector.

12. The connector system according to claim 1, wherein the first end of a connector is releasably connectable with the handle portion of the connector's respective weapon.

13. The connector system according to claim 1, wherein the first end of a connector is fixedly attached to the handle portion of the connector's respective weapon.

14. The connector system according to claim 1, wherein each of at least the first connector and the second connector are of substantially identical configuration to a third connector, the third connector having a first end adapted to connect with a handle portion of a respective third weapon and a second end having at least one engaging means, such that either of the first connector or the second connector can be releasably engaged with the at least one engaging means of the third connector, such that either of the first and the second connectors are connectable with the third connector to form substantially a single weapon assembly operable at one common handle comprising one of the first and second weapons connected to the third weapon.

15. A connector system for use in toy weaponry, the system comprising:
    at least a first connector and a second connector of substantially identical configuration, the first and the second connectors being adapted to connect with a respective one of at least a first weapon and a second weapon; each of the connectors comprising:
    a first end adapted to connect with a handle portion of the respective weapon; and
    a second end having at least one engaging means;
    wherein the at least one engaging means of the first connector is configured to be releasably engageable with the at least one engaging means of the second connector, such that the first and the second weapons are connectable to form substantially a single weapon assembly operable at one common handle;
    wherein at least one of the first and the second connectors comprises a switch triggerable to electrically connect one or more signalling means provided at one or more of the first and the second weapons with a power source; and
    wherein the one or more signalling means comprise one or more of an illuminating means and a sound-emitting means.

16. The connector system according to claim 15, wherein the one or more signalling means are provided at one or more blade portions of the one or more weapons.

17. A connector of the connector system according to claim 1 or claim 16, comprising:
    a first end connectable at a handle portion of a first weapon;
    a second end having at least one engaging means,
    wherein the at least one engaging means is configured to be substantially identical to, and be releasably engageable with a corresponding connecting portion of a second weapon, such that the first and the second weapons are connectable to form substantially a single weapon assembly operable at one common handle.

18. A kit of parts comprising one or more connector systems according to claim 1 or claim 16 and a plurality of toy weapons, wherein the one or more connector systems are for connecting two or more of the plurality of toy weapons to form substantially a single weapon assembly operable at one common handle.

\* \* \* \* \*